(12) United States Patent
Koukoumidis et al.

(10) Patent No.: US 11,625,622 B2
(45) Date of Patent: Apr. 11, 2023

(54) MEMORABLE EVENT DETECTION, RECORDING, AND EXPLOITATION

(71) Applicant: Microsoft Technology Licensing, LLC, Redmond, WA (US)

(72) Inventors: Emmanouil Koukoumidis, Kirkland, WA (US); Joseph Johnson, Jr., Seattle, WA (US); Dustin I. Abramson, Bellevue, WA (US); Maria A. Rangel, Bellevue, WA (US); Ying Wang, Bellevue, WA (US); Di Li, Beijing (CN); Steven G. Zittrower, Kissimmee, FL (US); Hailong Mu, Redmond, WA (US); Kelli A. Stuckart, Seattle, WA (US); Hudong Wang, Bellevue, WA (US); Pengfei Hao, Bellevue, WA (US); Donald F. Brinkman, Seattle, WA (US); Kati A. London, New York, NY (US); Zhan Chen, Shinagawa-ku (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 891 days.

(21) Appl. No.: 15/624,141

(22) Filed: Jun. 15, 2017

(65) Prior Publication Data

US 2018/0365570 A1 Dec. 20, 2018

(51) Int. Cl.
*G06N 5/04* (2006.01)
*G06F 40/30* (2020.01)
(Continued)

(52) U.S. Cl.
CPC ............. *G06N 5/04* (2013.01); *G06F 40/216* (2020.01); *G06F 40/284* (2020.01);
(Continued)

(58) Field of Classification Search
CPC .... G06F 40/284; G06F 40/216; G06F 40/295; G06F 40/30; G06N 3/0472; G06N 3/088; G06N 7/005
See application file for complete search history.

(56) References Cited

U.S. PATENT DOCUMENTS 8,700,009 B2 4/2014 Quy
9,226,004 B1 12/2015 Plante
(Continued)

FOREIGN PATENT DOCUMENTS

WO 2016174634 A1 11/2016

OTHER PUBLICATIONS

Yang, et al., "Context-rich Detection of User's Emotions using A Smartphone", In Microsoft Research Internship Report, 2011, 5 pages.

*Primary Examiner* — Casey R. Garner
(74) *Attorney, Agent, or Firm* — Workman Nydegger

(57) ABSTRACT

Aspects of the present disclosure provide systems and methods for detecting memorable events of a user, storing those memorable events in a user profile, and leveraging those events to the user. In so doing, memorable events with positive emotional weight may be recalled to encourage delightful experiences. Alternatively or additionally, memorable events with negative emotional weight may be recalled to increase user engagement for conversational systems.

20 Claims, 9 Drawing Sheets

(51) Int. Cl.
    *G06F 40/216*   (2020.01)
    *G06F 40/284*   (2020.01)
    *G06F 40/295*   (2020.01)
    *G06N 3/08*     (2006.01)
    *G06N 3/04*     (2006.01)
    *G06N 7/00*     (2006.01)
    *G06N 3/088*    (2023.01)

(52) U.S. Cl.
    CPC ............ *G06F 40/295* (2020.01); *G06F 40/30* (2020.01); *G06N 3/0472* (2013.01); *G06N 3/088* (2013.01); *G06N 7/005* (2013.01)

(56) References Cited

U.S. PATENT DOCUMENTS

| | | |
|---|---|---|
| 9,450,907 B2 | 9/2016 | Pridmore et al. |
| 2008/0096533 A1 | 4/2008 | Manfredi et al. |
| 2013/0339446 A1* | 12/2013 | Balassanian .......... H04L 65/403 709/204 |
| 2015/0100157 A1 | 4/2015 | Houssin et al. |
| 2015/0235135 A1 | 8/2015 | Shastri et al. |
| 2015/0297109 A1* | 10/2015 | Garten ................... A61B 5/375 600/544 |
| 2016/0302711 A1* | 10/2016 | Frank ..................... A61B 5/746 |
| 2017/0006214 A1 | 1/2017 | Andreassen et al. |
| 2018/0240076 A1* | 8/2018 | Thio ....................... G10L 15/08 |
| 2019/0034536 A1* | 1/2019 | Papp ...................... G06Q 50/22 |

\* cited by examiner

… (1)

MEMORABLE EVENT DETECTION, RECORDING, AND EXPLOITATION

BACKGROUND

People experience many events every day. Many of these events are of no particular interest to the user; however, some of these events may be memorable, causing an emotional reaction by the user. For example, some events may carry strong positive or negative emotional weight. However, such memorable events are not typically recorded by the user who experiences them. It is with respect to these and other general considerations that aspects have been described. Although relatively specific problems have been discussed, it is understood that the aspects should not be limited to solving the specific problems identified in the background.

SUMMARY

Aspects of the present disclosure are directed toward memorable event detection, recordation, and exploitation.

In a first aspect, a system comprising: an event detection server comprising: at least one processing unit; and at least one memory storing computer executable instructions that, when executed by the at least one processing unit, cause the system to perform a method, the method comprising: receiving emotional reaction information; receiving event information; applying one or more rules to the emotional reaction information to determine an emotion; applying one or more rules to the event information to determine an event; correlating the emotion to the event; based on a determination that the emotion exceeds one or more predetermined thresholds, characterizing the emotion as a memorable event; and leveraging the memorable event.

In a second aspect, a method for detecting and leveraging memorable events, the method comprising: receiving emotional reaction information; receiving event information; applying one or more rules to the emotional reaction information to determine an emotion; applying one or more rules to the event information to determine an event; correlating the emotion to the event; based on a determination that the emotion exceeds one or more predetermined thresholds, characterizing the emotion as a memorable event; and leveraging the memorable event.

In a third aspect, a computer-readable storage medium storing computer executable instructions that, when executed by at least one processing unit, cause a computing device to: receive emotional reaction information; receive event information; apply one or more rules to the emotional reaction information to determine an emotion; apply one or more rules to the event information to determine an event; correlate the emotion to the event; based on a determination that the emotion exceeds one or more predetermined thresholds, characterize the emotion as a memorable event; and leverage the memorable event.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
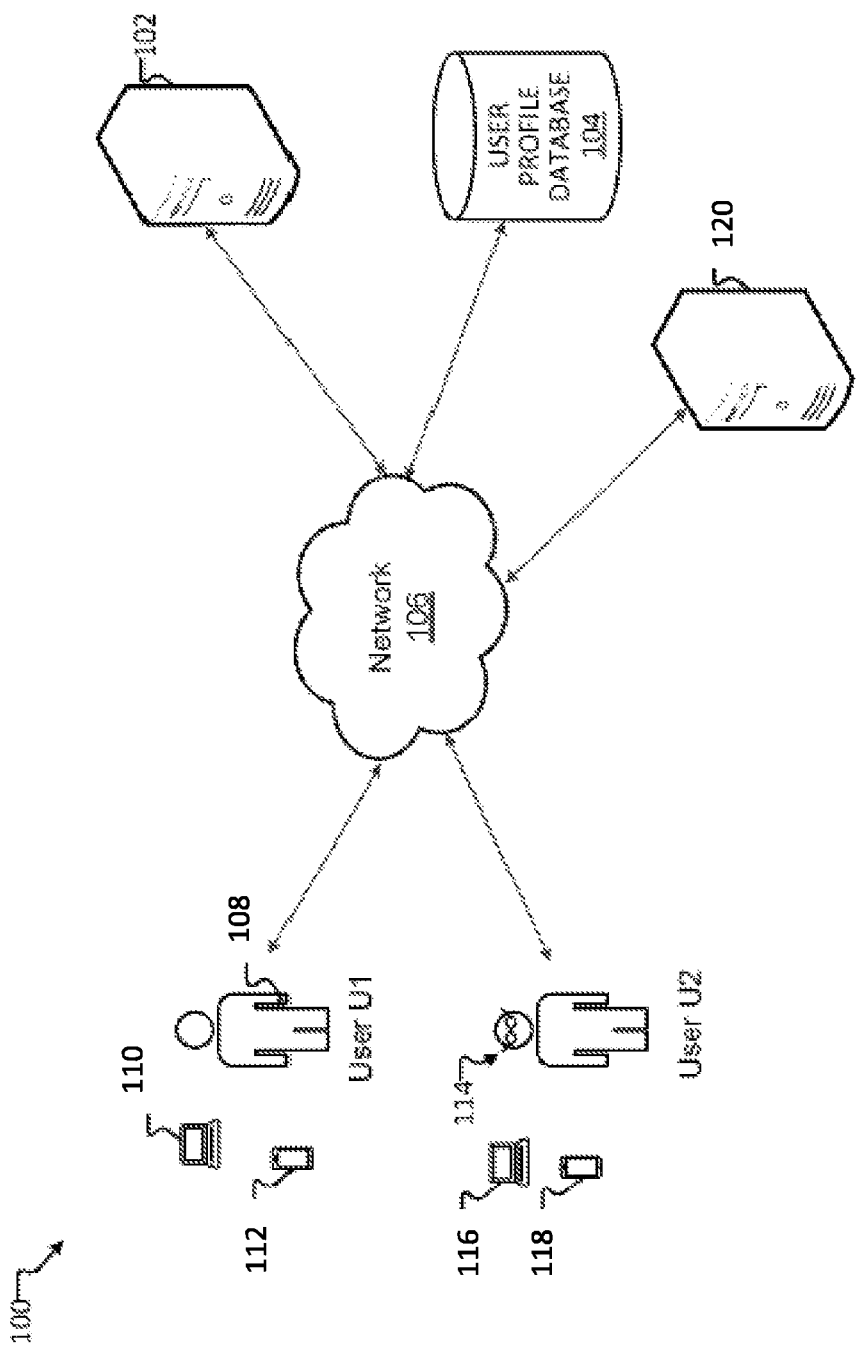
FIG. 1 illustrates a system for implementing memorable event detection, storing memorable events, and recollecting memorable events, according to an example aspect.

Various aspects will be described in detail with reference to the drawings, wherein like reference numerals represent like parts and assemblies throughout the several views. Reference to various aspects does not limit the scope of the claims attached hereto. Additionally, any examples set forth in this specification are not intended to be limiting and merely set forth some of the many possible aspects for the appended claims.

As described herein, users experience numerous events every day, some of which are memorable events that carry positive or negative emotional weight. Users oftentimes fail to record such memorable events for many reasons. For example, a memorable event may catch a user by surprise, preventing the user from recording the event. Furthermore, it may also be too tedious for a user to even record such memorable events. The emotional event based memory system described herein discloses systems and methods for detecting memorable events of a user, storing those memorable events, and later recalling those events to the user. Accordingly, memorable events with positive emotional weight may be recalled to encourage delightful experiences. Alternatively or additionally, memorable events with negative emotional weight may be recalled to increase user engagement for conversational systems.

As will be described in further detail herein, a rich set of sensors may be used to measure a user's emotional reactions to various events. Sensors may include for example, a mobile telephone; a smart phone; a tablet; a phablet; a smart watch; a wearable computer; a personal computer; a desktop computer; a laptop computer; a gaming device/computer (e.g., Xbox®); a television; goggles; smart glasses, a heart rate monitor; and the like. Alternatively or additionally, the same set of sensors or a different set of sensors may also be used to measure another user's emotional reactions to the same events. Based on the user's or the other user's emotional reactions to events, the system may determine which, if any, of those events may be memorable. Memorable events may thereafter be stored in a user profile. Those memorable events may be presented at a later time to the user based on, for example, a similar conversation topic/subject or alternatively, to assist in engaging the user in conversation.

FIG. 1 illustrates a system for implementing memorable event detection, storing memorable events, and recollecting memorable events, according to an example aspect.

As illustrated, the system 100 may include one or more users U1, U2, wherein each user is associated with one or more computing devices. System 100 further includes an event detection server 102, and a user profile database 104. The user computing devices, event detection server 102, and user profile database 104 may be connected over a network 106.

In some aspects, the network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing devices as described herein may communicate with some components of the system via a local network (e.g., an enterprise intranet), whereas such server computing devices may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

In this example, user 1 U1 is associated with a laptop computing device 110, a smart watch 108, and a cell phone 112. User 2 U2 is associated with a laptop computing device 116, a cell phone 118, and smart glasses 114. Although specific computing devices are illustrated, any combination of computing devices may be associated with a user and used to detect events. Furthermore, the computing devices used to detect events are not limited to those illustrated in FIG. 1. In other examples, the system 100 may include other computing devices that may detect a user's events. Even further, some computing devices may not necessarily be associated with the user, but may be positioned to detect the user's emotional reactions. For example, a video camera, listening console, a television, microphone, or a gaming console (or gaming console component) may be positioned in the same room in which the user is located and may detect the user's emotions. Thus, in a basic configuration, the one or more computing devices may be, for example, a mobile telephone; a smart phone; a tablet; a phablet; a smart watch; a wearable computer; a personal computer; a desktop computer; a laptop computer; a gaming device/computer (e.g., Xbox®); a television; goggles; smart glasses, a heart rate monitor; and the like. This list is exemplary only and should not be considered as limiting. Any suitable computing device may be used to detect a user's emotional reaction information and corresponding events. Such computing devices will be referred to herein as detection devices.

As described herein, the detection devices may collect emotional reaction information from the user as the user experiences events. Emotional reaction information may be in the form of raw data (e.g., biometric information, speech, text, video feed, etc.). Emotional reaction information may be indicative of an emotional reaction, such as, for example, happiness, excitement, sadness, fear, etc. Such emotional reaction information may be provided to the event detection server 102. Furthermore, the detection devices may detect the events the user experiences and, additionally, may provide event information to the event detection server 102.

Events may be any occurrence that the user may experience. For example, an event may be a conversation the user is having with one or more other people, a show the user is watching, a sporting event the user attends, etc.

As will be described in further detail herein, a memorable event may be any of those events that causes an emotional reaction in the user that is significant in some way, and may carry positive or negative emotional weight. Thus, the system 100 described herein is capable of detecting the user's emotional reactions to events the user experiences and determines which, if any, of those events are memorable events.

In an example, the one or more detection devices may detect a user's emotional reaction information by measuring the user's biometric information such as the user's heart rate, heart rate variability, breathing pattern, amount of perspiration using a galvanic skin response device, etc. Alternatively or additionally, the detection devices may detect the user's emotional reaction information by analyzing the user's facial expressions, body movements, hand gestures, etc. Still further, the detection devices may detect the user's emotional reaction information by analyzing the user's typed speech (e.g., via a user's email, instant message "TM", text message) or spoken speech (e.g., detecting the user's speech using a microphone of a detection device and identifying the user's speech and tone via natural language processing).

In one example, the one or more detection devices may work by implementing a lexicon or a dictionary of words that may be pre-labeled with emotional signals or emotional information. Alternatively or additionally, these devices may implement machine learned emotional signals from supervised labels where human annotators label data as identifying an emotion or some other sentiment (e.g., a positive or negative sentiment). Alternatively or additionally, the devices may implement unsupervised or semi-supervised machine learning algorithms that can learn emotions or sentiment from other relationships like multi-modal signals such as voice, image, and video (e.g., by correlating a large database of music lyrics, audio information, and video information aligned with time information, where labels may be inferred from facial expressions).

The emotional reaction information and event information may be collected by the detection devices simultaneously and in real time as the user experiences such events and emotions. As will be described in further detail, the event detection server 102 may correlate the emotional reaction information to a particular event in the event information.

Additionally or alternatively, detection devices may similarly collect emotional reaction information from one or more other users who are affiliated with the user. For example, another user who is experiencing the same event as the user may also have one or more associated detection devices from which the system may gather emotional reaction information. The other user's emotional reaction information may be used to analyze and confirm the user's emotional reaction information. For example, if several users each had the same or similar emotional reactions to a particular event, then the measured emotional reaction information of the user can be confirmed with a higher degree of accuracy.

Additionally or alternatively, another user's emotional reaction information may be gathered to gauge that other user's emotional reaction to something said or done by the user. For example, emotional reaction information may be collected from another user who hears an offensive statement made by the user. Such a statement may be reacted to differently by the two users. The other user may react more emotionally to such an offensive statement than the user who utters the statement. Accordingly, such emotional reaction information from other users may be collected and saved to the user's profile so as to later remind the user of his or her offensive statement.

In an example, the event detection server 102 receives emotional reaction information simultaneously as it receives event information so that it can correlate the user's emotional reaction to a particular event. In some aspects, the event detection server 102 receives the emotional reaction information and event information in real time.

In an example, the event detection server 102 may receive and process the emotional reaction information collected by the one or more detection devices to determine the user's emotion. In an example, the event detection server 102 may process the received emotional reaction information by applying various thresholds, natural language processing, and other algorithms to such emotional reaction information to determine the user's emotion as it relates to a particular event. As described herein, a determined emotion may be any emotion the user may experience such as, for example, happiness, delight, sadness, fear, apprehension, nervousness, joy, grief, etc.

The event detection server 102 can further apply rules to the emotions to determine whether the emotion is strong enough so as to categorize the corresponding event as being memorable. For example, the event detection server 102 might apply various threshold rules to the determined emotions to determine whether that emotion is significant. If so, the corresponding event may be characterized as being a memorable event. The event detection server may further categorize each memorable event as being a positive memorable event or a negative memorable event.

The event detection server 102 may further store the emotional reaction information, event information, emotion, and memorable events in a user profile database 104. The user profile database may store, for each user, such information and corresponding timestamps so as to understand when such events and emotions occurred. In some aspects, the memorable events may be stored in the user profile database 104 as a topic, as a way of categorizing the memorable event. The user profile database 104 may further store information relating to the event such as, for example, the location of each event, other users near the user, etc.

The user profile database 104 may also store emotional reaction information of other users associated with or near the user. For example, the heart rates of all fans attending a music concert may be recorded in the user's profile. In some aspects, emotional reaction information of other user's may be associated with the user by, for example, using the geographical location of the other users. In the concert example, all other users who attended the concert, based on their geographical location at the same location, may be recorded in the user's profile. Emotional reaction information of other users may be helpful in confirming the user's reaction (e.g., if something exciting happened at a particular moment, evaluating other users' reactions at the same time may be used to verify the user's reaction). Alternatively or additionally, the emotional reaction information of others users may be used to decide when to start capturing the user's reaction. For example, if the system 100 detects that the concert crowd is becoming excited, then the emotional reaction of the user may automatically be captured. Additionally or alternatively, the collective emotional state of the crowd may be used to determine that the event is memorable, thereby capturing the user's emotional reaction information, thereby indicating to the system 100 to capture information using the user's one or more detection devices (e.g., camera) to record the memorable event.

Alternatively or additionally, other user's information may be associated with the user by evaluating other users' check-in information (e.g., evaluating check-in information using a social media application). In other aspects, the user may have, saved in their user profile in the user profile database 104, a list of other users who is associated with the user. For example, the user may have family members, friends, colleagues, teammates, etc. listed in their user profile. Accordingly, their devices may also be synced with the user. In some embodiments, other linked users' emotional reaction information may be used only if those users are in the same geographical location as the user.

The system 100 further includes a topic recollection server 120 that may leverage the user's memorable events by later engaging the user in conversation relating to the particular memorable event. As described herein, one or more topics comprising memorable events that the user experienced are saved in the user's profile in the user profile database 104. The one or more topics may also include timestamp information, metadata from the one or more devices on which the memorable event is based, etc. The topics may also include contextual information so as to provide further context about the memorable event. In some aspects, the topic recollection server 120 may proactively recall the topic and therefore bring the user back to the topic. Alternatively or additionally, the topic recollection server 120 may recall the topic if the topic relates to the current topic in which the user is engaged.

In some aspects, topic recollection server 120 may recall topics via one or more platforms. In one example, the topic recollection server 120 may interface with an instant messaging or email application used by the user. In such an aspect, the topic recollection server 120 may send an instant message or email to the user, asking the user a question relating to the user's memorable event. In another example, the topic recollection server 120 may interface with a smart speaker associated with the user. In such an aspect, the topic recollection server 120 may cause the speaker to ask the user a question relating to the user's memorable event. In other aspects, the topic recollection server 120 may interface with any smart, connected device associated with the user and send, to the user, a communication via the connected device.

In another example, a conversational bot or agent may proactively (when no conversation is occurring) or reactively (during an ongoing conversation) inquire about the memorable event. For example, the conversational bot my ask the user, "was the concert last night fun?" In this scenario, the concert relates to the memorable event. In another example, a special interface may display memorable events, enabling the user to browse and potentially share memorable events with others.

In an example, the one or more detection devices may detect that the user mentioned on Monday that he would see a movie on Wednesday. The event detection server 102 may determine that the user is excited about the movie and may store the event (e.g., "movie") in the user's profile in the user profile database 104. On Wednesday or any time after the user attended the movie, the topic recollection server 120 may recall the topic to the user by, for example, asking the user whether he enjoyed the movie he saw on Wednesday. As described in an example herein, the topic recollection server 120 may ask the question to the user via a smart speaker in the user's home.

In some aspects, the topic recollection server 120 may further leverage memorable events by creating a personal journal for the user. Such a journal may facilitate memories for the user. For example, the topic recollection server 120 may remind the user of happy, memorable events. In some aspects, the personal journal is a photo book or a video of a memorable event. In other aspects, the personal journal may take any other medium and may include any emotional reaction information. For example, a video of a father witnessing his son's first footsteps may be compiled using a video camera in the family's home. Additionally, the video may further include an image of the father's heart rate increasing as he witnesses his son's first footsteps. This powerful experience could therefore be captured and leveraged to remind the father about his happy moment.

In some aspects, a personal journal may be created in response to a determination that an event is memorable. For example, based on identifying a memorable event, the topic recollection server 120 may combine signals from various detection devices (e.g., a camera, a microphone, and a heart rate monitor), or even a single detection device, at a time corresponding to that memorable event. For example, signals from one or more detection devices may be combined at a time before, during, and after the memorable event to generate a personal journal. Alternatively or additionally, a personal journal may be created in response to a user's request.

In some examples, a personal journal may be created using sentence selection. In particular, the system may parse the user's social media data or any written data associated with the user to select the best sentences to construct an entry in the user's personal journal, wherein those sentences may be weighted by topics with emotions and adding contextual data that provide detail about the selected sentences. In such an example, probability and machine learning classifiers may be used to choose the sentences or paragraphs that best represent a topic. In some examples, a core chat index such as, for example, crowd sourced data from one or more databases may be used to fill in sentences that would make the journal entry more interesting or would provide more context to the entry. For example, snippets from various articles may be used to provide context to a particular event associated with the selected sentence (e.g., an article related to a sporting event that the user attended).

Alternatively or additionally, generative models such as generative neural networks, generative adversarial networks, or Markov networks may be used to generate sentences, rank those sentences, and a core chat index may be used to provide further context to the journal entry.

Alternatively or additionally, a semi-supervised combination of these techniques may be used where actual humans assist the system in generating the journal. In such an example, a machine learning system may begin the sentence or journal and a user may complete the sentence or the journal entry.

Accordingly, the system 100 can leverage a rich set of sensors such as, for example, sensors on a mobile telephone (camera, microphone); a smart phone; a tablet; a phablet; a smart watch; a wearable computer; a personal computer; a desktop computer; a laptop computer; a gaming device/computer (e.g., Xbox®); a television; goggles; smart glasses, a heart rate monitor; and the like to assist the user in detecting memorable events and recalling such memorable events to the user to encourage delightful experiences or to support the user by recalling the memorable event that carries negative weight.

Although specific servers, databases, and detection devices are described herein, functionality may be performed by any one of the servers, databases, and devices and are not limited to any single or combination of devices. Accordingly, in some aspects, leveraging memorable events may be performed by the event detection server.

Figure 2:
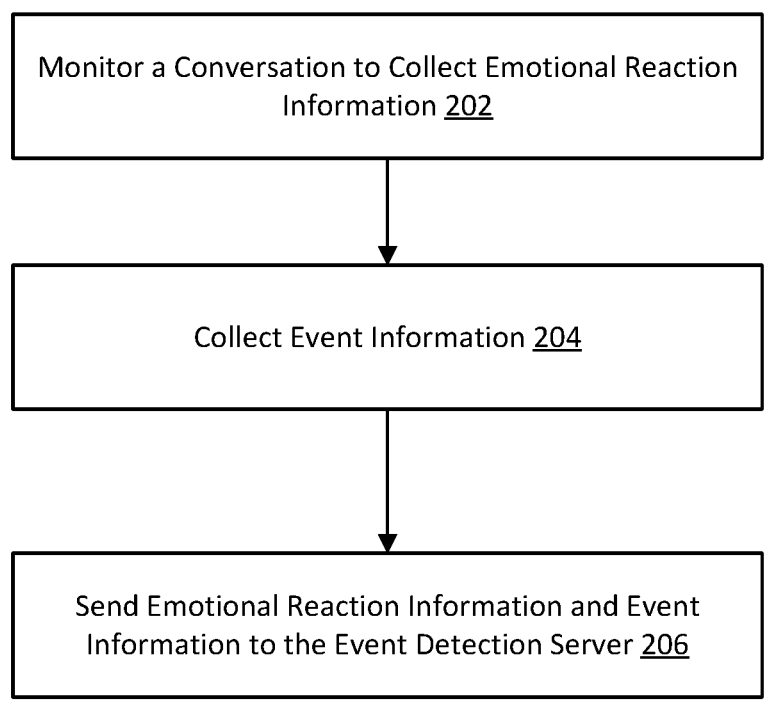
FIG. 2 illustrates a method for detecting memorable emotional events, according to an example aspect.

FIG. 2 illustrates a method for detecting memorable emotional events, according to an example aspect.

In this aspect, the method 200 may be performed by one or more detection devices. As described herein, the one or more detection devices may be, for example, Method 200 begins at operation 202 in which each of the one or more detection devices monitors a conversation in which a user is engaged in order to collect emotional reaction information. As described herein, emotional reaction information may be in the form of raw data (e.g., biometric information, speech, text, video, etc.). Emotional reaction information may be indicative of an emotional reaction, such as, for example, happiness, excitement, sadness, fear, etc.

A memorable event may be a significant event that causes an emotional reaction in the user, and may carry positive or negative emotional weight. In an example, the one or more detection devices may detect a user's emotional reaction information by measuring the user's biometric information such as the user's heart rate, heart rate variability, breathing pattern, etc. Alternatively or additionally, the detection devices may detect the user's emotional reaction information by analyzing the user's facial expressions, body movements, hand gestures, posture, etc. Still further, the detection devices may detect the user's emotional reaction information by analyzing the user's typed speech (e.g., via a user's email, instant message "TM", text message) or spoken speech (e.g., detecting the user's speech using a microphone of a detection device and identifying the user's speech and tone via natural language processing).

Alternatively or additionally, the one or more detection devices may collect emotional reaction information of other users who are associated with the user, such as users who are in the same conversation as the user or users who are in the same room as the user. Alternatively or additionally, one or more detection devices may be used to collect emotional reaction information of other users who are experiencing the same event as the user. In some aspects, those such other users may not necessarily be in the same location as the user.

In operation 204, the one or more detection devices may be used to collect event information. In some aspects, event information is captured simultaneously with the emotional reaction information. In some aspects, event information may be captured by capturing device metadata. In other aspects, event information may be captured from the user's calendar or even by observing the user's conversations in which the user may discuss an upcoming event over the phone, email, or text message. Event information may be raw data indicative of an event that the user is experiencing. For example, event information may be the subject matter of an event. In some aspects, the subject matter of the event may describe the particular event the user is experiencing or the user is discussing. For example, the user may be attending a concert, so the event information may be the name of the concert. In another example, the user may be on a date with another user, so the event information may be referred to as "date on Mar. 1, 2017" and may further include the name of the person with whom the user went on the date, the name of the restaurant, etc. Such event information may be collected simultaneously so as to be later correlated with the emotional reaction information, as will be described in further detail herein.

Furthermore, the one or more detection devices that captures event information in operation 204 may be the same as or different from the one or more detection devices that capture emotional reaction information in operation 202. As will be described in further detail herein, such information may be collected and stored in a user profile associated with the user.

In operation 206, the one or more detection devices may send the collected emotional reaction information and the event information to an event detection server over a network.

As should be appreciated, operations 202-206 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3:
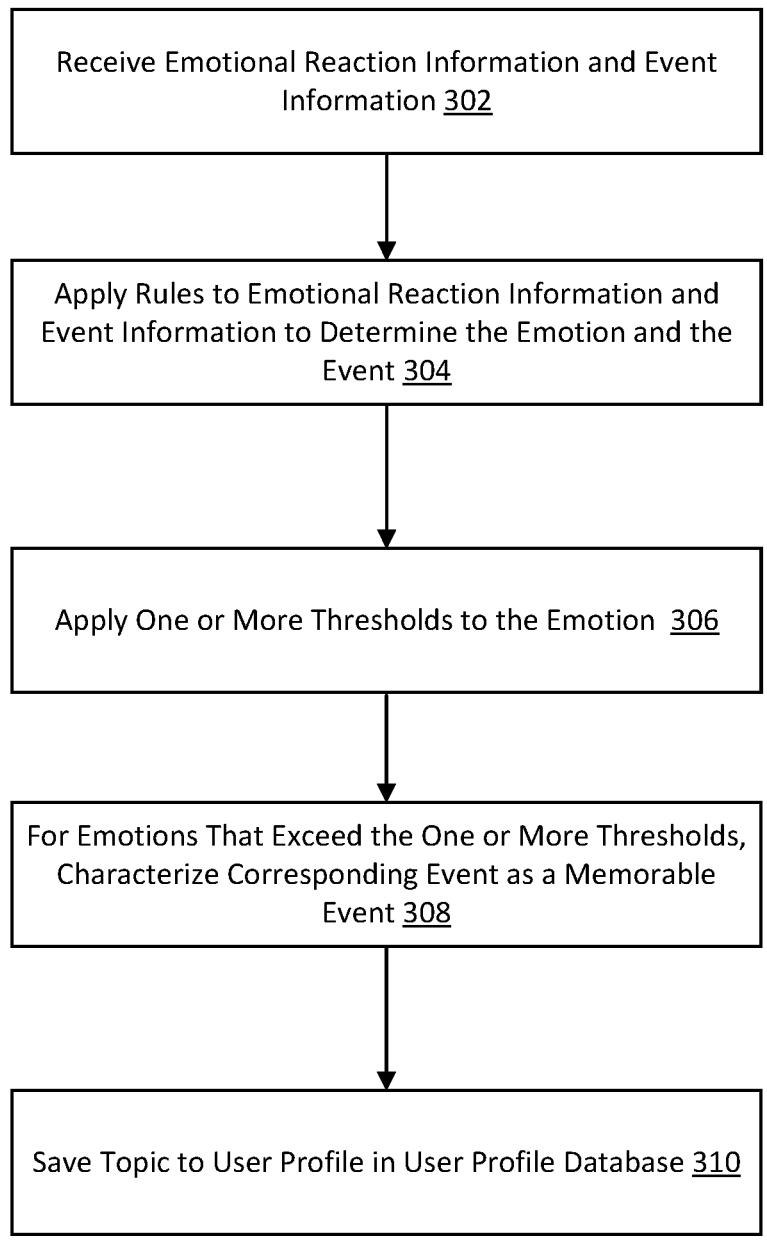
FIG. 3 illustrates a method for determining memorable emotional events, according to an example aspect.

FIG. 3 illustrates a method for determining memorable emotional events, according to an example aspect.

In this aspect, the method 300 may be performed by an event detection server, such as event detection server 102, as described herein. In other examples, such operations may be performed by one or more other devices. In operation 302, the event detection server 102 receives emotional reaction information and event information from the one or more detection devices. As described herein, emotional reaction information may be in the form of raw data (e.g., biometric information, speech, text, video feed, etc.). Emotional reaction information may be indicative of an emotional reaction, such as, for example, happiness, excitement, sadness, fear, etc. The event detection server may also receive event information from the one or more detection devices. As described herein, events may be any occurrence that the user may experience. For example, an event may be a conversation the user has with one or more other people, a show the user is watching, a sporting event the user attends, etc.

In operation 304, one or more rules are applied to the emotional reaction information and the event information to determine the emotion and event. In some aspects, rules applied to the emotional reaction information are different from the rules applied to the event information. This may be because rules applied to emotional reaction information may be used to determine the user's particular emotion. The rules applied to the event information may be language processing rules or other rules that may, for example, evaluate detection device metadata, to determine the particular event.

In some aspects, each user may have associated therewith, predefined user rules. In other words, a user may have associated therewith rules that the user determines are important. For example, a rule may be set such that any discussion of the user's upcoming wedding must be flagged as a memorable event. Alternatively or additionally, a user may have associated therewith rules that are personalized to the user. For example, a rule may establish user excitement if the particular user's heartrate exceeds a certain number, wherein the number may differ from user to user. In some aspects, the rules may be trained over time (e.g., using machine learning techniques) to predict or detect the user's emotional state from different types of sensory data over time. Alternatively or additionally, emotions may be inferred from regularly recurring keywords or phrases used by the user. For example, if the user says the phrase, "I am excited" or other similar words or phrases that can be represented with regular expressions, then the system may use such keywords or phrases to determine the user's emotional state. Accordingly, in operation 304, the event detection server determines the user's particular emotion (e.g., happy, sad, fear, etc.) and the event.

Furthermore, emotional reaction information from multiple different detection devices may be used to determine an emotion. For example, the user's breathing rate and heart rate may be used in conjunction to determine whether the user is excited. Such rules may be applied to emotional reaction information from different detection devices (or the same detection device that can measure multiple different signals) to determine the user's emotion.

Furthermore, in operation 304, the determined emotion and the determined event may be correlated together. For example, the determined emotion and event, which are based on emotional reaction information and event information, respectively, may have associated therewith, a timestamp. Accordingly, each emotion and event may be correlated based on time so as to track which emotion corresponds to which event.

In operation 306, the event detection server applies a threshold to the determined emotion to determine whether the corresponding event is memorable. In some aspects, the event detection server applies a threshold value to the emotion to determine whether the emotion is significant. As described herein, each emotion is based on emotional reaction information. In an example, the event detection server may determine whether a user's emotion indicating excitement exceeds a certain predetermined threshold value (e.g., if the user's underlying breathing rate increases above a certain threshold value) to determine whether the corresponding event is memorable. As described herein, emotions may be determined based upon different signals measured from one or more detection devices (e.g., both breathing and heart rates to determine excitement). Accordingly, thresholds may be applied to each individual signal to determine whether the corresponding event is memorable. In some aspects, the determination of whether the emotion is significant and therefore exceeds a predetermined threshold level, may also be achieved by assessing an increasing or decreasing trend, etc. In some aspects, the threshold level may be defined differently depending on the application. For example, a lower threshold level may trigger the detection of memorable events more frequently, and a higher threshold level may trigger the detection of memorable events less frequently. In some aspects, machine learning is used to optimize the thresholds.

Accordingly, in operation 308, for each emotion that exceeds the threshold, the event detection server may characterize the corresponding event as being memorable. As described herein, for each emotion that is significant, which may be measured by applying thresholds to the underlying data, the corresponding event is characterized as being memorable. As described herein, in some aspects, the memorable events may be stored as topics. In some aspects, topics include the event information as well as the emotion.

In operation 310, the event detection server sends each topic to the user's profile in the user profile database. In some aspects, the event detection server may also send other information to the user profile database, such as, for example, additional emotional reaction information that surrounds the memorable event so as to provide further context to the memorable event.

As should be appreciated, operations 302-310 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4:
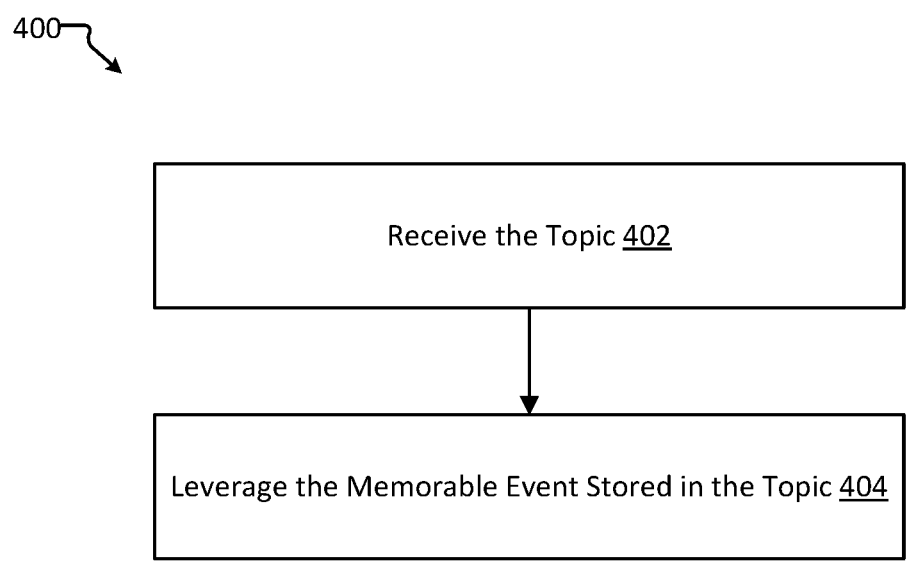
FIG. 4 illustrates a method for recalling memorable events, according to an example aspect.

FIG. 4 illustrates a method for recalling memorable events, according to an example aspect.

In this aspect, the method 400 may be performed by a topic recollection server, such as topic recollection server 120, as described herein. As described herein, memorable events may be stored as topics. Topics may include the event information as well as the corresponding emotion. In operation 402, the topic recollection server may receive one or more topics from the user profile database. In some aspects, the topic recollection server queries the user profile database for topics regularly (e.g., daily, monthly, weekly). In other aspects, the user profile database sends one or more topics to the topic recollection server regularly. Additionally or alternatively, the topic recollection server may send one or more topics to the topic recollection server upon receiving a topic.

In operation 404, the topic recollection server may leverage the memorable event. As described herein, the topic may comprise the memorable event and corresponding emotion. The topic recollection server may, after a predetermined period of time (as might be identified in the user profile or stored in the topic recollection server), proactively recall the topic, thereby bringing the user back to the topic. For example, after a few days, the topic recollection server may leverage the memorable event by asking the user how his date went, in the example that the topic related to the user's date.

Alternatively or additionally, the topic recollection server may leverage the memorable event stored in the topic only if the user is currently engaged in a discussion related to the memorable event. Accordingly, the topic recollection server may bring up the topic during the current conversation.

As described herein, topic recollection server may recall topics via one or more platforms. In one example, the topic recollection server may interface with an instant messaging or email application used by the user. In such an aspect, the topic recollection server may send an instant message or email to the user, asking the user a question relating to the user's memorable event. In another example, the topic recollection server may interface with a smart speaker associated with the user. In such an aspect, the topic recollection server may cause the speaker to ask the user a question relating to the user's memorable event. In other aspects, the topic recollection server may interface with any smart, connected device associated with the user and send, to the user, a communication via the connected device.

As described herein, in some aspects, the topic recollection server may further leverage memorable events by creating a personal journal for the user. Such a journal may facilitate happy memories by reminding the user of happy, memorable events. In some aspects, the personal journal is a photo book or a video of memorable event. In other aspects, the personal journal may take any other medium and may include any emotional reaction information. For example, a video of a father witnessing his son's first footsteps may be compiled using a video camera in the family's home. Additionally, the video may further include an image of the father's heart rate increasing as he witnesses his son's first footsteps. This powerful experience could therefore be captured and leveraged so as to remind the father how his happy moment.

Although a topic recollection server is described herein, such functionality may be performed by the event detection server or any combination of devices.

As should be appreciated, operations 402-404 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, as described herein.

Figure 5:
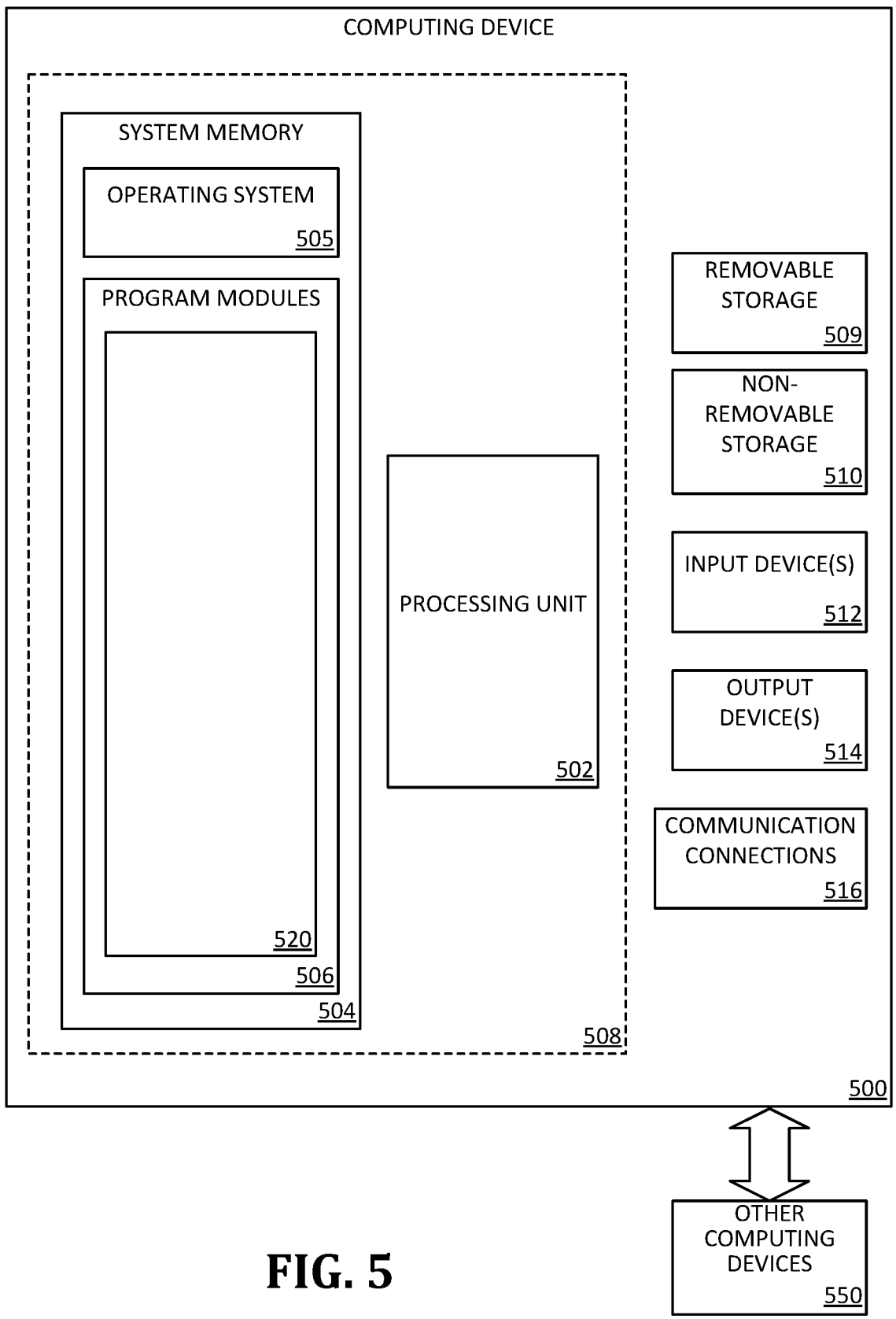
FIG. 5 is a block diagram illustrating physical components (e.g., hardware) of a computing device with which aspects of the disclosure may be practiced.

FIG. 5 is a block diagram illustrating physical components (e.g., hardware) of a computing device 500 with which aspects of the disclosure may be practiced. The computing device components described below may have computer executable instructions for implementing aspects of the present disclosure on a computing device (e.g., event detection server 102, topic recollection server 120, or detection devices), that can be executed to implement the methods disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for operating the systems and methods described herein.

The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a nonremovable storage device 510. As stated above, a number of program modules and data files may be stored in the system memory 504. While executing on the processing unit 502, the program modules 506 may perform processes including, but not limited to, the aspects, as described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
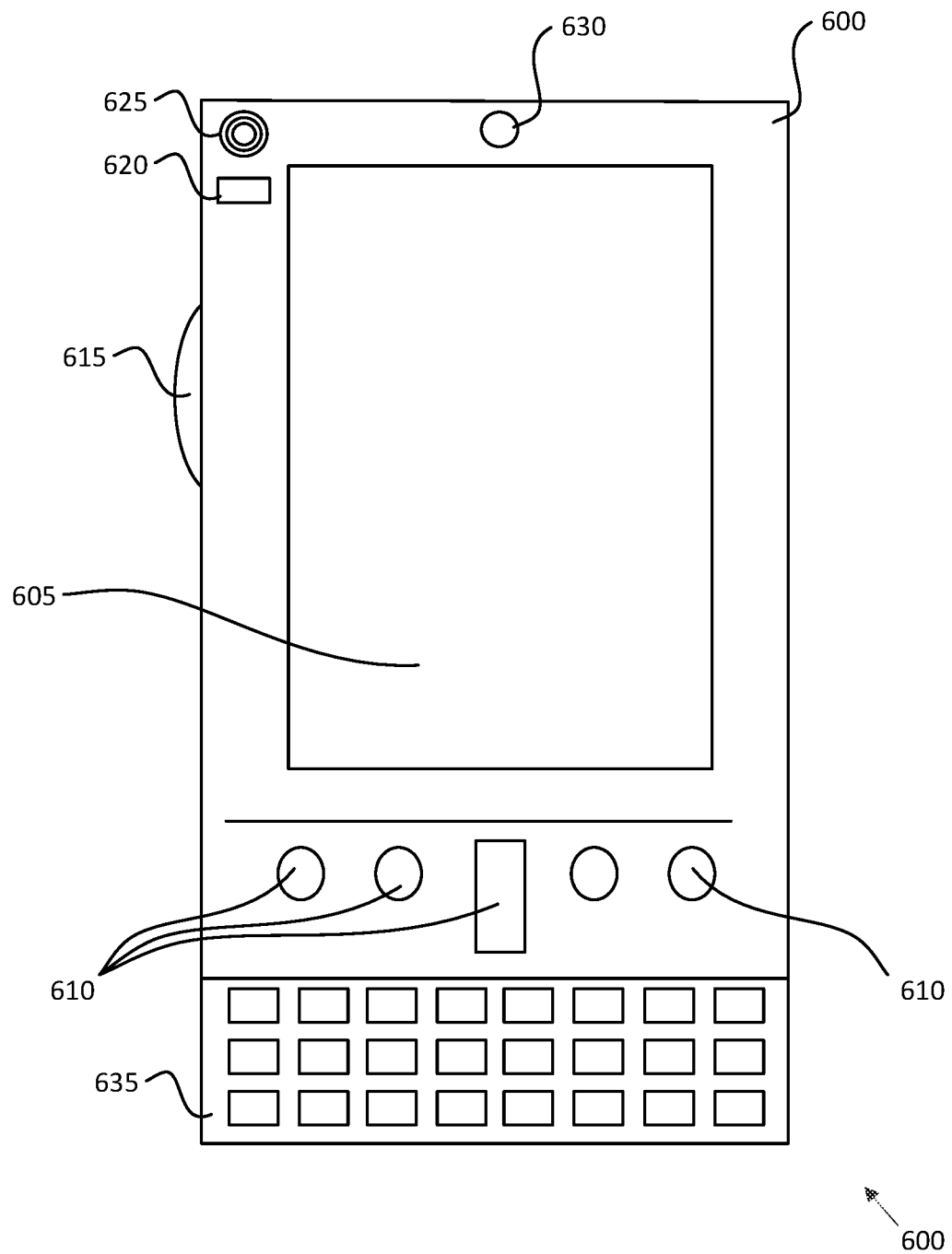
FIG. 6A and FIG. 6B illustrate a mobile computing device, for example, a mobile telephone, a smart phone, wearable computer (such as a smart watch), a tablet computer, a laptop computer, and the like, with which aspects of the disclosure may be practiced.
Figure 6B:
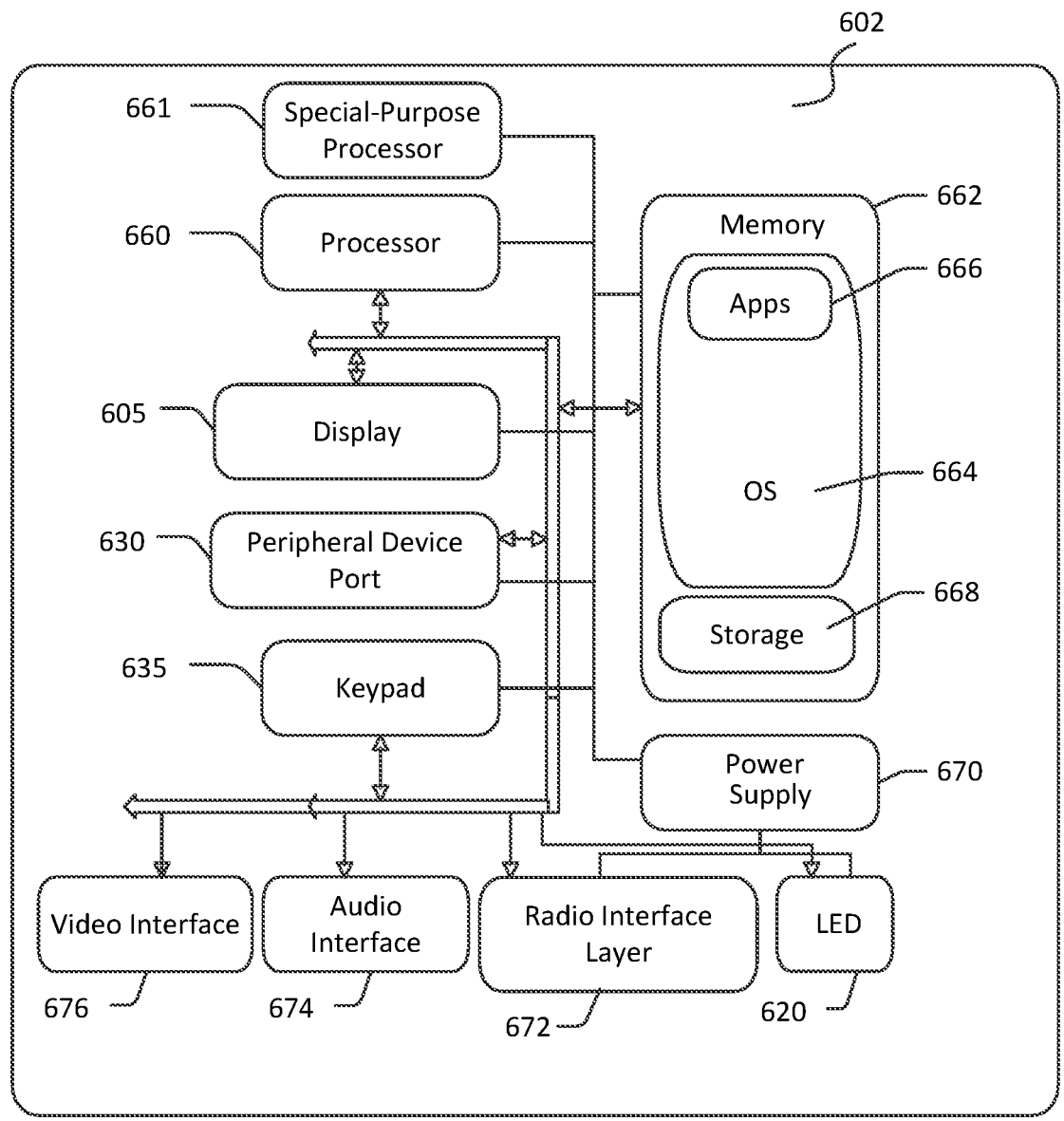

FIG. 6A and FIG. 6B illustrate a mobile computing device 600, for example, a mobile telephone, a smart phone, wearable computer (such as a smart watch), a tablet computer, a laptop computer, and the like, with which aspects of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements.

The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the nonvolatile storage area 668, such as email or other messages used by an email application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 may further include an external power source, such as an AC adapter or a powered docking cradle that supplements or recharges the batteries. The system 602 may also include a radio interface layer 672 that performs the function of transmitting and receiving radio frequency communications.

The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via an audio transducer 625 (e.g., audio transducer 625 illustrated in FIG. 6A). In the illustrated aspect, the visual indicator 620 is a light emitting diode (LED) and the audio transducer 625 may be a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with aspects of the present disclosure, the microphone may also serve as an audio sensor to facilitate control of notifications, as will be described below. The system 602 may further include a video interface 676 that enables an operation of peripheral device 630 (e.g., on-board camera) to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668. The system 602 may also include a special-purpose processor 661.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

As should be appreciated, FIGS. 6A and 6B are described for purposes of illustrating the present methods and systems and is not intended to limit the disclosure to a particular sequence of steps or a particular combination of hardware or software components.

Figure 7:
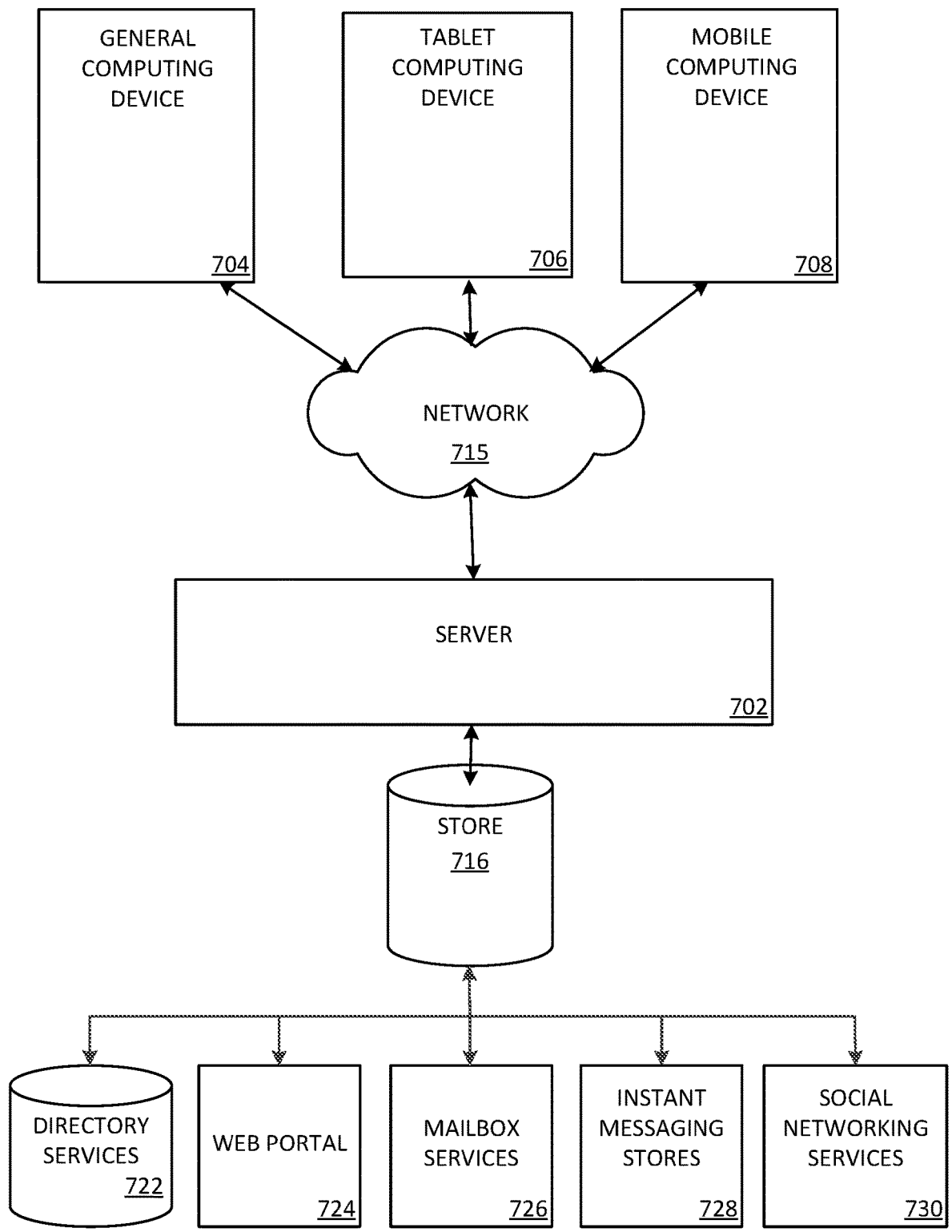
FIG. 7 illustrates one aspect of the architecture of a system for processing data received at a computing system from a remote source, such as a general computing device (e.g., personal computer), tablet computing device, or mobile computing device, as described above.

FIG. 7 illustrates one aspect of the architecture of a system for processing data received at a computing system from a remote source, such as a general computing device 704 (e.g., personal computer), tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking service 730. The server device 702 may provide data to and from a client computing device such as a general computing device 704, a tablet computing device 706 and/or a mobile computing device 708 (e.g., a smart phone) through a network 715. By way of example, the computer system described above may be embodied in a general computing device 704 (e.g., personal computer), a tablet computing device 706 and/or a mobile computing device 708 (e.g., a smart phone). Any of these aspects of the computing devices may obtain content from the store 716, in addition to receiving graphical data useable to either be pre-processed at a graphic-originating system or post-processed at a receiving computing system.

As should be appreciated, FIG. 7 is described for purposes of illustrating the present methods and systems and is not intended to limit the disclosure to a particular sequence of steps or a particular combination of hardware or software components.

Figure 8:
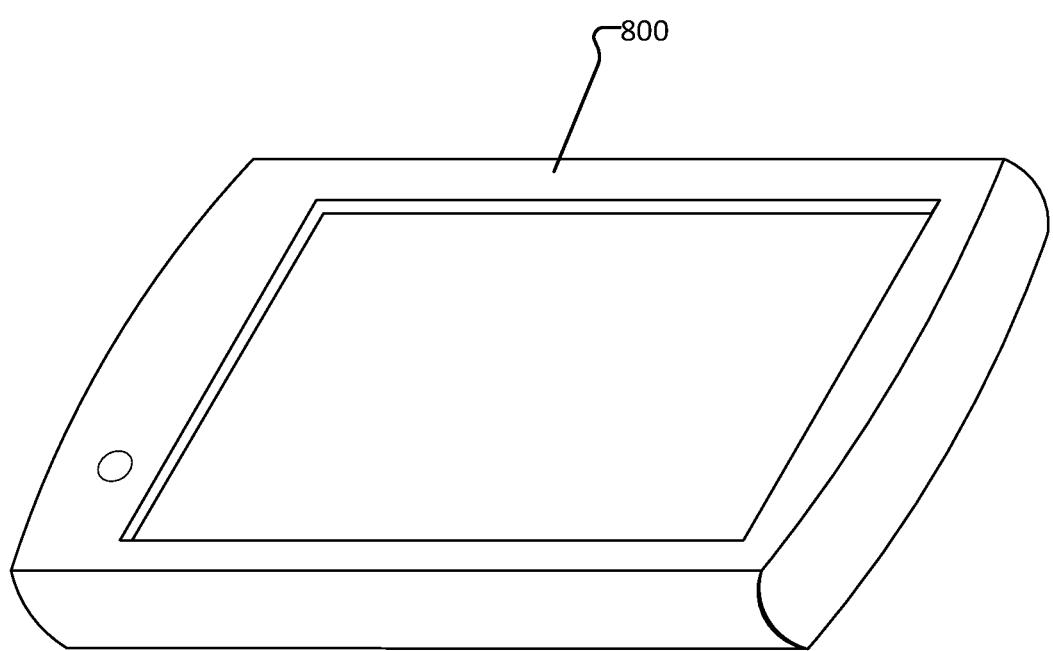
FIG. 8 illustrates an exemplary tablet computing device that may execute one or more aspects disclosed herein.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 8 is described for purposes of illustrating the present methods and systems and is not intended to limit the disclosure to a particular sequence of steps or a particular combination of hardware or software components.

Aspects of the present disclosure, for example, are described above with reference to block diagrams or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this disclosure are not intended to limit or restrict the scope of the disclosure as claimed in any way. The aspects, examples, and details provided in this application are considered sufficient to convey possession and enable others to make and use the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system configured to detect memorable events of a user by implementing a set of one or more trained rules, which are trained using machine learning, to determine an emotional state of the user, where the emotional state of the user is then used to determine whether a particular memorable event has transpired, said system comprising:
   one or more processors; and
   one or more physical memory that stores instructions that are executable by the one or more processors to cause the system to:
      receive, from one or more detection devices, emotional reaction information associated with the user;
      receive, from the one or more detection devices, first event information that includes a topic;
      train a machine learning algorithm to learn emotions based on multi-modal signals comprising at least one of a voice signal, an image signal, or a video signal;
      cause the machine learning algorithm, which is trained based on the learned emotions, to train a set of one or more rules to generate a set of one or more trained rules, wherein the machine learning algorithm uses said learning to train the set of one or more rules to predict an emotional state of the user;
      apply the set of one or more trained rules to the emotional reaction information to predict the emotional state of the user;
      apply one or more rules to the first event information to determine an event;
      correlate the emotional state to the event;
      based on a determination that the emotional state exceeds one or more predetermined thresholds, characterize the event as a memorable event;
      save the topic to a user profile;
      after a period of time, detect the topic in a subsequent event involving the user;
      receive second event information, which includes the topic, where the topic is associated with the subsequent event;
      save the topic again, from the second event information, in the user profile; and
      based on saving the topic again, from the second event information, in the user profile, recollect the memorable event during the subsequent event.

2. The system of claim 1, wherein correlating the emotional state to the event is based on comparing a time stamp associated with the emotional state to a time stamp associated with the event.

3. The system of claim 1, further comprising:
   categorizing the memorable event as the topic, wherein the topic includes contextual information.

4. The system of claim 1, wherein the one or more detection devices are positioned in a same room as the user.

5. The system of claim 1, wherein the one or more detection devices are one or more of: a laptop computing device, a tablet computing device, a cell phone, a goggle computing device, a gaming console, a microphone, a camera, a listening console, a television, a heart rate monitor, and a smart speaker.

6. The system of claim 1, wherein execution of the instructions further causes the system to:
   receive second emotional reaction information and third event information from another user associated with the user.

7. The system of claim 1, wherein:
   the set of one or more trained rules is associated with the user,
   a second user is associated with a second set of one or more trained rules, and
   the set of one or more trained rules is different from the second set of one or more trained rules.

8. The system of claim 1, wherein recollecting the memorable event further comprises:
   generating a personal journal comprising the memorable event.

9. The system of claim 1, wherein the memorable event is recollected by automatically posting the memorable event to a social media site.

10. The system of claim 1, wherein detecting the topic in the subsequent event comprises:
    monitoring a subsequent conversation of the user; and
    determining a subject of the subsequent conversation is the topic.

11. A method for detecting memorable events of a user by implementing a set of one or more trained rules, which are trained using machine learning, to determine an emotional state of the user, where the emotional state of the user is then used to determine whether a particular memorable event has transpired, the method comprising:
    receiving, from one or more detection devices, emotional reaction information associated with the user;
    receiving, from the one or more detection devices, first event information that includes a topic;
    training a machine learning algorithm to learn emotions based on multi-modal signals comprising at least one of a voice signal, an image signal, or a video signal;
    causing the machine learning algorithm, which is trained based on the learned emotions, to train a set of one or more rules to generate a set of one or more trained rules, wherein the machine learning algorithm uses said learning to train the set of one or more rules to predict an emotional state of the user;
    applying the set of one or more trained rules to the emotional reaction information to predict the emotional state of the user;
    applying one or more rules to the first event information to determine an event;
    correlating the emotional state to the event;
    based on a determination that the emotional state exceeds one or more predetermined thresholds, characterizing the event as a memorable event;
    saving the topic to a user profile;
    after a period of time, detecting the topic in a subsequent event involving the user;
    receiving second event information, which includes the topic, where the topic is associated with the subsequent event;
    saving the topic again, from the second event information, in the user profile; and
    based on saving the topic again, from the second event information, in the user profile, recollecting the memorable event during the subsequent event.

12. The method of claim 11, wherein correlating the emotional state to the event is based on comparing a time stamp associated with the emotional state to a time stamp associated with the event.

13. The method of claim 11, wherein the topic includes contextual information.

14. The method of claim 11, further comprising:
receiving second emotional reaction information and third event information from another user associated with the user.

15. The method of claim 11, further comprising:
after the predetermined period of time, querying periodically the user profile for a reoccurrence of the topic to indicate that the topic was subsequently received.

16. The method of claim 11, wherein recollecting the memorable event further comprises:
generating a personal journal comprising the memorable event.

17. The method of claim 11, wherein at least one of the one or more rules is defined by the user.

18. The method of claim 11, wherein detecting the topic in the subsequent event comprises:
monitoring a subsequent conversation of the user; and
determining a subject of the subsequent conversation is the topic.

19. A method for detecting memorable events of a user by implementing a set of one or more trained rules, which are trained using machine learning, to determine an emotional state of the user, where the emotional state of the user is then used to determine whether a particular memorable event has transpired, the method comprising:
receiving, from one or more detection devices, (i) emotional reaction information associated with the user and (ii) first event information, wherein the emotional reaction information and the first event information are generated during an overlapping time period;
training a machine learning algorithm to learn emotions based on multi-modal signals comprising at least one of a voice signal, an image signal, or a video signal;
causing the machine learning algorithm, which is trained based on the learned emotions, to train a set of one or more rules to generate a set of one or more trained rules, wherein the machine learning algorithm uses said learning to train the set of one or more rules to predict an emotional state of the user;
applying the set of one or more trained rules to the emotional reaction information to predict the emotional state of the user;
based on the first event information, determining an event that occurred when the emotional reaction information was generated, wherein the event is then correlated with the emotional state;
based on a determination that the emotional state exceeds one or more predetermined thresholds, characterizing the event as a memorable event;
after a period of time, detecting a subsequent event involving the user, wherein information is collected about the subsequent event, and wherein an analysis of the information indicates that a topic of the subsequent event is similar to a topic of the event; and
triggering recollection of the memorable event during the subsequent event.

20. The method of claim 19, wherein the different types of acquired sensory data further include one or more of a heart rate of the user, a heart rate variability, a breathing pattern, an amount of perspiration using a galvanic skin response device, a body movement, or a hand gesture.

* * * * *